(12) United States Patent
Sylvain

(10) Patent No.: US 8,462,750 B2
(45) Date of Patent: Jun. 11, 2013

(54) USING REACHABILITY INFORMATION TO FACILITATE PEER-TO-PEER COMMUNICATIONS

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 10 days.

(21) Appl. No.: 12/848,482

(22) Filed: Aug. 2, 2010

(65) Prior Publication Data

US 2010/0318668 A1    Dec. 16, 2010

Related U.S. Application Data

(63) Continuation of application No. 11/190,279, filed on Jul. 26, 2005, now Pat. No. 7,769,017.

(51) Int. Cl.
- H04L 12/28 (2006.01)
- H04L 12/66 (2006.01)
- H04W 4/00 (2009.01)
- G06F 15/16 (2006.01)

(52) U.S. Cl.
USPC ........... 370/338; 370/351; 370/353; 709/228; 709/245

(58) Field of Classification Search
USPC .......... 370/254–338, 351–465; 709/203–227, 709/228–245
See application file for complete search history.

(56) References Cited

U.S. PATENT DOCUMENTS

| | | | |
|---|---|---|---|
| 5,666,661 A | 9/1997 | Grube et al. | |
| 5,995,500 A | 11/1999 | Ma et al. | |
| 6,108,704 A | 8/2000 | Hutton et al. | |
| 6,813,644 B1 * | 11/2004 | Jamieson et al. | 709/242 |
| 6,885,660 B2 | 4/2005 | Inbar et al. | |
| 6,957,069 B2 | 10/2005 | Shah et al. | |
| 7,139,760 B2 | 11/2006 | Manion et al. | |
| 7,236,472 B2 | 6/2007 | Lazaridis et al. | |
| 7,283,519 B2 * | 10/2007 | Girard | 370/353 |
| 7,284,068 B1 * | 10/2007 | Ramalho | 709/245 |
| 7,415,534 B2 * | 8/2008 | Jamieson et al. | 709/242 |
| 7,447,150 B1 | 11/2008 | Sylvain | |

(Continued)

FOREIGN PATENT DOCUMENTS

WO    2005/094108 A1    10/2005

OTHER PUBLICATIONS

International Search Report for PCT/IB2006/002013 mailed Dec. 19, 2006, 4 pages.

(Continued)

*Primary Examiner* — Man Phan
(74) *Attorney, Agent, or Firm* — Meyertons, Hood, Kivlin, Kowert & Goetzel, P.C.

(57) ABSTRACT

The present invention allows originating endpoints to obtain reachability information from a directory service, which collects contact and related information from available users. When initiating a peer-to-peer communication session to an endpoint of a destination user, the originating endpoint will access the directory service to obtain reachability information for the destination user. The reachability information may contain one or more addresses, one of which will be a peer-to-peer communication session address. From the reachability information, the originating terminal will determine an appropriate address to initiate communications with the destination user. The reachability information may identify multiple addresses, where only certain of the addresses may be peer-to-peer communication addresses and other addresses may be used to establish other types of sessions through disparate types of networks.

11 Claims, 10 Drawing Sheets

U.S. PATENT DOCUMENTS

| | | | |
|---|---|---|---|
| 7,522,639 | B1 | 4/2009 | Katz |
| 7,536,467 | B2 | 5/2009 | Guo et al. |
| 7,548,758 | B2 | 6/2009 | Periyalwar et al. |
| 7,685,290 | B2 * | 3/2010 | Satapati ............... 709/227 |
| 2002/0141343 | A1 * | 10/2002 | Bays .................... 370/235 |
| 2002/0152299 | A1 * | 10/2002 | Traversat et al. ...... 709/223 |
| 2002/0176404 | A1 | 11/2002 | Girard |
| 2004/0028080 | A1 | 2/2004 | Samarasinghe et al. |
| 2004/0064512 | A1 | 4/2004 | Arora et al. |
| 2004/0088347 | A1 | 5/2004 | Yeager et al. |
| 2004/0125776 | A1 | 7/2004 | Haugli et al. |
| 2004/0133640 | A1 | 7/2004 | Yeager et al. |
| 2004/0148434 | A1 | 7/2004 | Matsubara et al. |
| 2004/0162871 | A1 | 8/2004 | Pabla et al. |
| 2005/0243819 | A1 | 11/2005 | Peng et al. |
| 2005/0259655 | A1 * | 11/2005 | Cuervo et al. .......... 370/392 |
| 2006/0018301 | A1 * | 1/2006 | Schrufer ................ 370/351 |
| 2006/0062203 | A1 | 3/2006 | Satapati |
| 2006/0077955 | A1 | 4/2006 | Poustchi et al. |
| 2006/0174039 | A1 * | 8/2006 | Stewart et al. ......... 709/245 |
| 2006/0194596 | A1 | 8/2006 | Deng |

OTHER PUBLICATIONS

Non-Final Office Action mailed Jul. 24, 2008 issued by the Patent Office during the prosecution of U.S. Appl. No. 11/190,279, 14 pages.

Final Office Action mailed Feb. 23, 2009 issued by the Patent Office during the prosecution of U.S. Appl. No. 11/190,279, 13 pages.

Non-Final Office Action mailed Sep. 24, 2009 issued by the Patent Office during the prosecution of U.S. Appl. No. 11/190,279, 18 pages.

Notice of Allowance mailed Mar. 25, 2010 issued by the Patent Office during the prosecution of U.S. Appl. No. 11/190,279, 9 pages.

* cited by examiner

USING REACHABILITY INFORMATION TO FACILITATE PEER-TO-PEER COMMUNICATIONS

CROSS-REFERENCE TO RELATED PATENT APPLICATIONS

The present application is a continuation of U.S. Pat. No. 7,769,017, filed on Jul. 26, 2005 and issued on Aug. 3, 2010, entitled "USING REACHABILITY INFORMATION TO FACILITATE PEER-TO-PEER COMMUNICATIONS."

BACKGROUND OF THE INVENTION

Field of the Invention

The present invention relates to peer-to-peer communications, and in particular to using reachability information to facilitate establishing peer-to-peer communications.

BRIEF SUMMARY OF THE INVENTION

The present invention allows originating endpoints to obtain reachability information from a directory service, which collects contact and related information from available users. When initiating a peer-to-peer communication session to an endpoint of a destination user, the originating endpoint will access the directory service to obtain reachability information for the destination user. The reachability information may contain one or more addresses, one of which will be a peer-to-peer communication session address. From the reachability information, the originating terminal will determine an appropriate address to initiate communications with the destination user. The reachability information may identify multiple addresses, where only certain of the addresses may be peer-to-peer communication addresses and other addresses may be used to establish other types of sessions through disparate types of networks.

The reachability information may also include status information, preference information, or a combination thereof, wherein the originating terminal can use the status or preference information to help select an appropriate address to use for initiating communications with the destination user. The status information may bear on the state or location of the destination user or any device associated with the destination user. The preference information may represent a variable function to assist in selecting an appropriate address based on available information, which may include the status information.

The originating endpoint may select multiple addresses to which communication sessions, including peer-to-peer communication sessions, may be initiated to one or more devices of the destination user. The communication sessions may be initiated in sequence or simultaneously. When initiated in sequence, different addresses may be provided with different priorities in light of any selection criteria provided in the reachability information. Although one of the sessions is generally a peer-to-peer communication session, alternate sessions may be established through alternate networks or using alternate communication techniques. For example, a peer-to-peer communication session may be initiated through local wireless techniques, and if that peer-to-peer communication session is not established, an alternate communication session may be established through a cellular network. Peer-to-peer communication sessions and other sessions may be initiated through wired or wireless techniques, which may include local wireless or cellular communication techniques.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWING

The accompanying drawing figures incorporated in and forming a part of this specification illustrate several aspects of the invention, and together with the description serve to explain the principles of the invention.

DETAILED DESCRIPTION OF THE INVENTION

Figure 1:
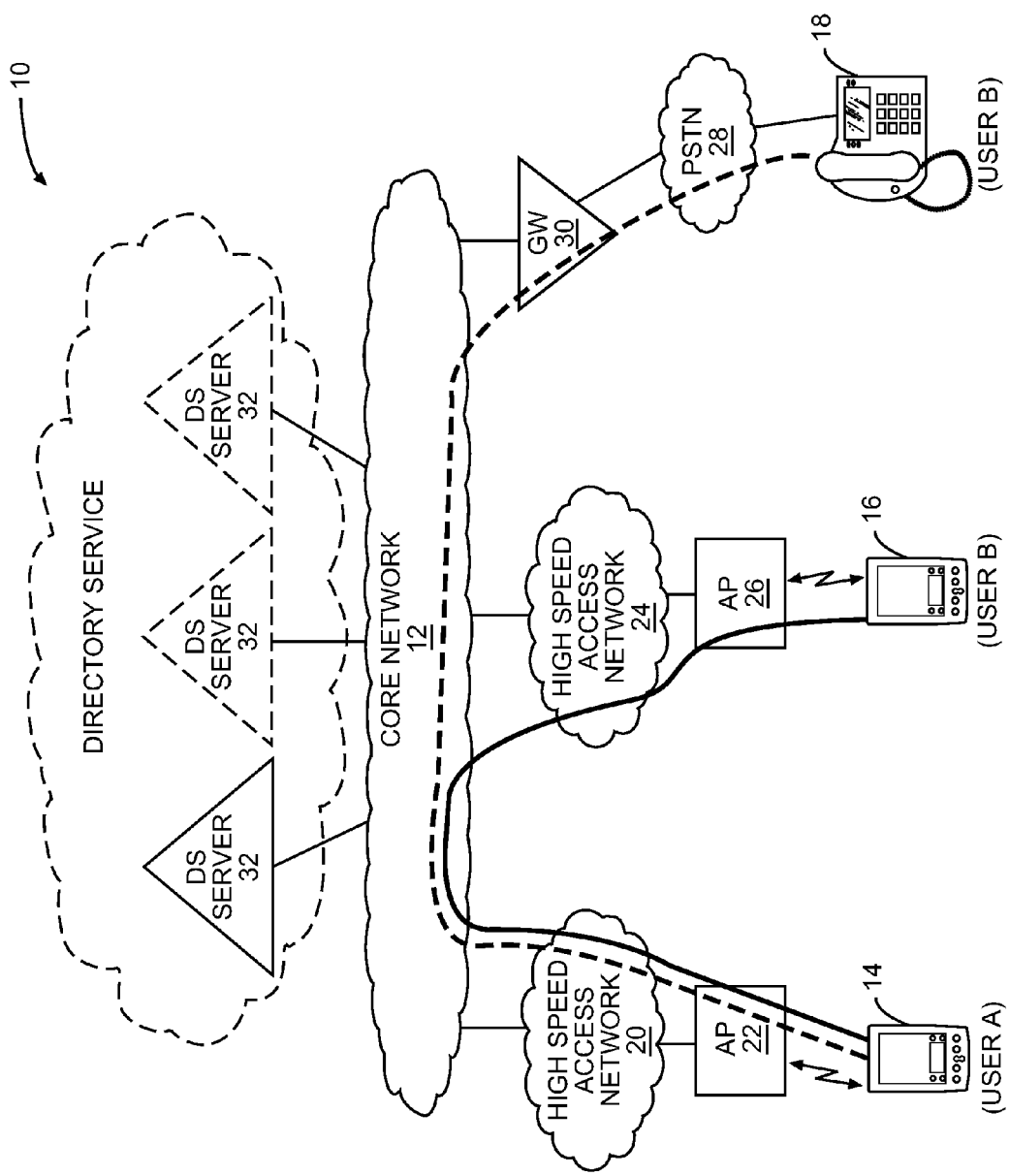
FIG. 1 is a block representation of a communication environment according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention allows a peer-to-peer (P2P) endpoint to obtain reachability information pertaining to a second P2P endpoint from a directory service. The reachability information will include one or more addresses associated with the second P2P endpoint. The first P2P endpoint can then use an address from the reachability information to establish a P2P communication session with the second P2P endpoint. Reachability information may also include status information, preferences, or a combination thereof corresponding to the user associated with the second P2P endpoint. The status information may relate to the relative availability of the user for communications, the availability of the user's endpoints, or the state of devices associated with the user. For example, the user's status may include presence information, which may bear on the location and availability of the user for communications for any one or more communication devices. The status information may aid the first P2P endpoint in determining the most appropriate one of the multiple addresses provided in the reachability information to use when initiating a P2P communication session with the user. Multiple addresses may be associated with the same or different P2P endpoints associated with the user. Further, the addresses may be associated with endpoints or communication techniques that do not use P2P communication sessions to facilitate communications.

The preference information may provide criteria or rules to assist the originating P2P endpoint in determining an appropriate one of the multiple addresses provided in the reachability information. The preference information may dictate that a certain address be selected based on the terminating user's status, time, date, active communication devices, address priority, filtering criteria, or any other criteria alone or in combination that will allow the originating P2P endpoint to select an appropriate way in which to initiate P2P or other communications to the terminating P2P endpoint or other device associated with the second user. The addresses provided in the reachability information may include Internet Protocol (IP), Session Initiation Protocol (SIP), H.323, or other peer-to-peer based address. If P2P communications are not available or preferred, other address alternatives may include traditional E.164 addresses for landline or cellular terminals. The E.164 addresses are generally seven or ten digit directory numbers, such as 321-555-1212.

Prior to delving into the details of the present invention, an overview of a communication environment according to a first embodiment of the invention is provided. With reference to FIG. 1, a communication environment 10 is centered about a core network 12, which allows communication terminals 14, 16, and 18 to communicate with each other and with other communication endpoints (not shown) through various access facilities. As illustrated, terminal 14 is a wireless endpoint, such as a mobile telephone or personal digital assistant, which is capable of supporting local wireless communications and preferably cellular communications. When supporting local wireless communications, such as those defined in the IEEE 802.11a/b/g or Bluetooth standards, access to the core network 12 is provided through a high-speed access network 20 and an access point (AP) 22, which also supports local wireless communications. The access point 22 may be part of a wireless local area network (WLAN). The high-speed access network 20 may be an Ethernet-based local area network (LAN), digital subscriber line (DSL) network, or cable network.

Similarly, terminal 16 may also support local wireless or cellular communications, wherein access to the core network 12 is provided through high-speed access network 24 and access point 26, which supports local wireless communications. In the example shown in FIG. 1, terminal 18 is a landline telephone that is supported by the Public Switched Telephone Network (PSTN) 28. The PSTN 28 may interface with the predominantly packet-based core network 12 through an appropriate gateway 30, which will provide the requisite traffic and signaling conversions to facilitate interworking between the core network 12 and the PSTN 28, as those skilled in the art will readily recognize.

For the present invention, a directory service is provided in an integrated or distributed fashion by one or more directory service servers 32, respectively. As such, the directory service servers 32 may represent traditional servers, other endpoint clients, or a combination thereof, which cooperate to provide the directory service. The directory service servers 32 will maintain reachability information for various P2P users and their respective terminals (or endpoints) and provide reachability information to other P2P users upon request, such that the requesting P2P user can determine an appropriate address to use to initiate a P2P communication session with a desired user, or alternatively establish some other form of session with the desired user.

As illustrated in FIG. 1, assume terminal 14, which is associated with User A, desires to initiate a P2P communication session with an endpoint associated with User B. Terminal 14 will obtain reachability information for User B from the directory service server 32. The reachability information may include addresses for both terminals 16 and 18, which are associated with User B. Assume the reachability information either prioritizes or provides sufficient information to allows terminal 14 to determine that the address associated with terminal 16 is a primary address, and the address associated with terminal 18 is an alternate address. As such, terminal 14 will initiate a P2P communication session to terminal 16 (solid line), and if that session fails or is otherwise not possible, terminal 14 will initiate a P2P communication session with terminal 18 through gateway 30 (dashed line). The addressing information for terminal 18 may include the requisite information to address gateway 30 in an appropriate fashion to establish communications. In addition to attempting to establish P2P communication sessions sequentially to different addresses, terminal 14 may initiate P2P communication sessions to terminals 16 and 18 simultaneously, using their respective addresses, wherein the first session established may be elected and the alternate attempt may be dropped.

Figure 2:
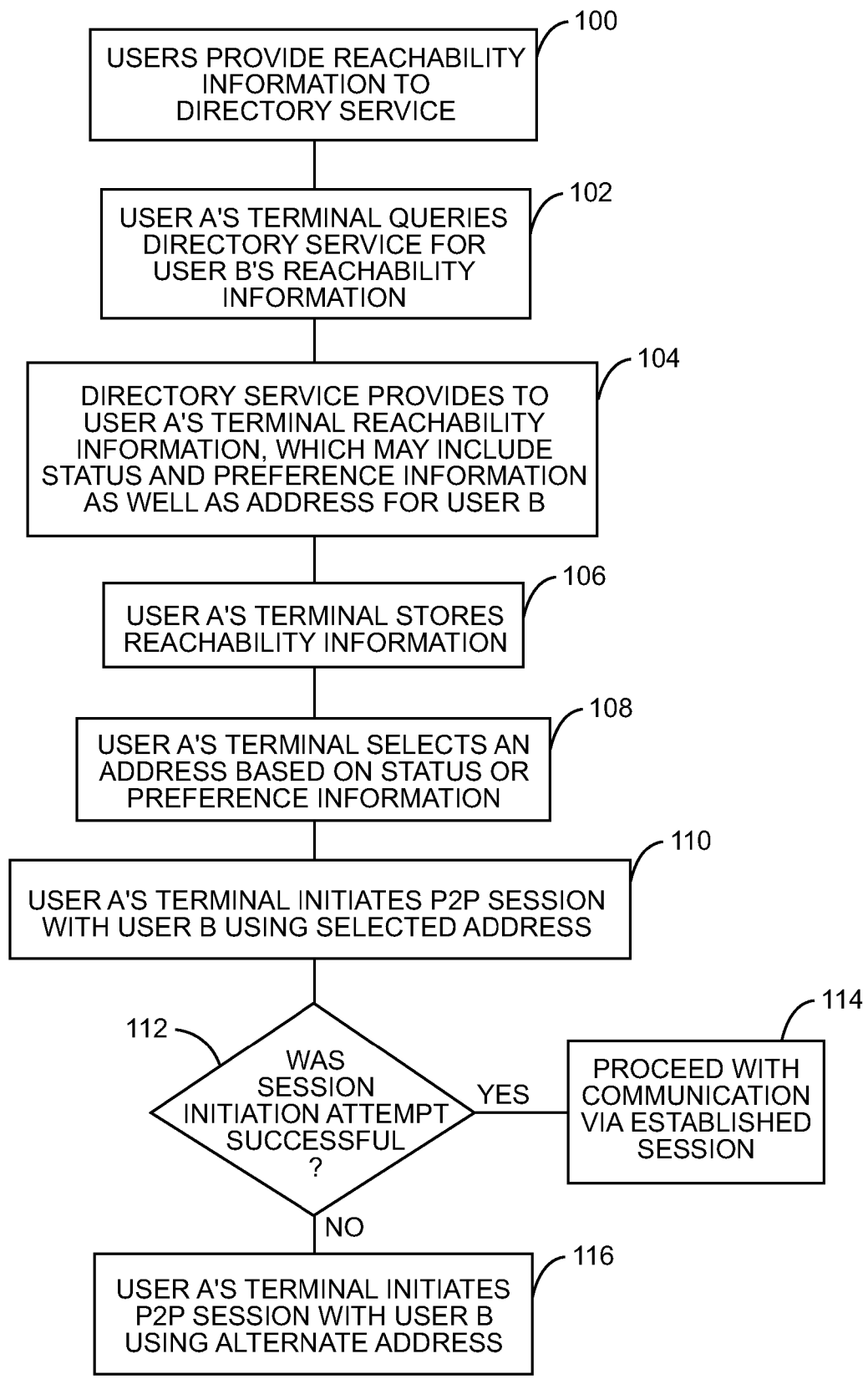
FIG. 2 is a flow diagram illustrating operation of the present invention according to one embodiment of the present invention.

With reference to FIG. 2, a basic flow diagram illustrates the operation described above. Initially, subscribing users will provide reachability information to the directory service, which is implemented by one or more directory service servers 32 (step 100). When User A desires to initiate a P2P communication session with User B, User A's terminal will query the directory service for User B's reachability information (step 102). The directory service will obtain User B's reachability information and will provide User B's reachability information, which may include status and preference information as well as the available addresses for User B, to User A's terminal (step 104). User A's terminal will store the reachability information (step 106) and then process the reachability information to select an address, perhaps based on the status information, preference information, or a combination thereof (step 108). User A's terminal will then initiate a P2P communication session with the terminal of User B associated with the selected address (step 110). If the session initiation attempt for the P2P communication session is successful (step 112), User A and User B's terminal will proceed with communications via the established P2P communication session (step 114). If the session initiation attempt for the P2P communication session was not successful (step 112), User A's terminal will attempt to initiate a P2P communication session using the alternate address for User B (step 116). Depending on the number of available addresses provided in the reachability information, any number of alternate attempts may be made to establish a P2P or other type of communication session with an endpoint associated with User B. Again, multiple attempts to establish a communication session may occur sequentially or simultaneously, depending on the configuration of the terminals of User A (14) and User B (16, 18).

Figure 3:
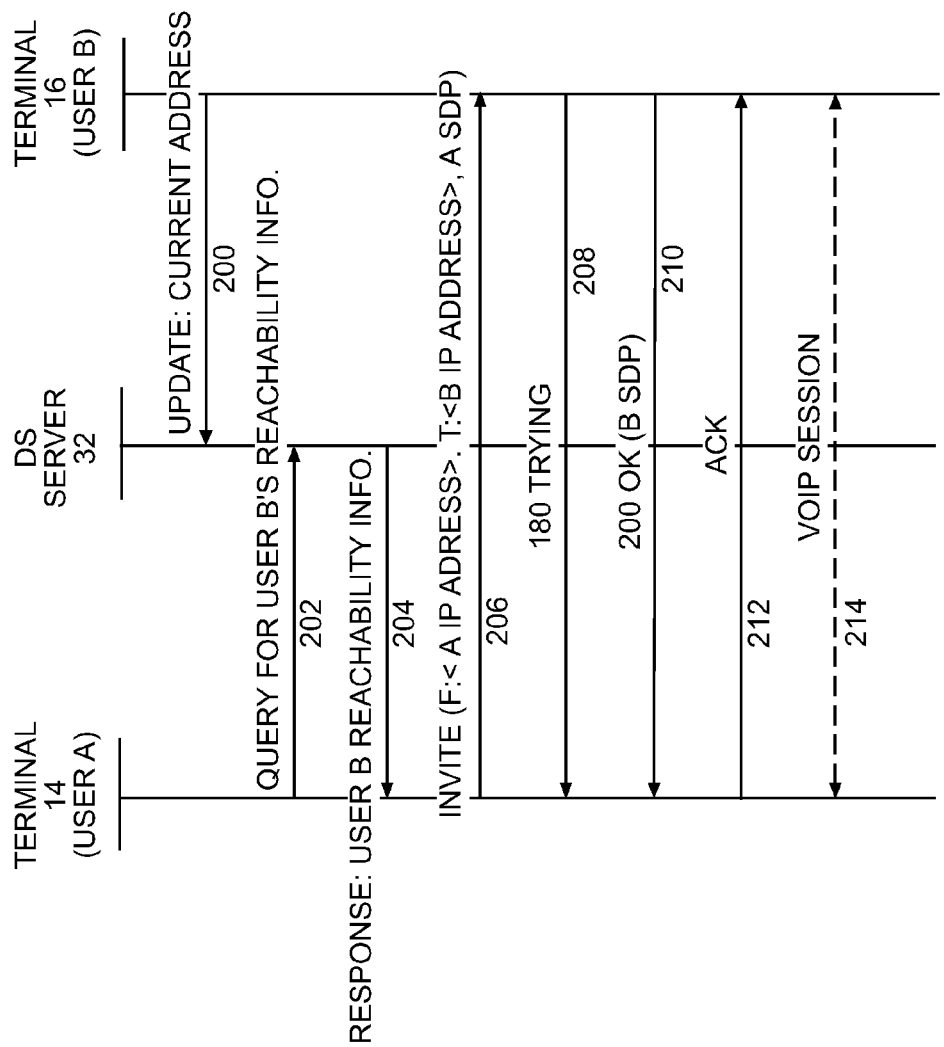
FIG. 3 is a communication flow diagram for establishing a P2P communication session to a primary address according to one embodiment of the present invention.

With reference to FIG. 3, a communication flow diagram is provided wherein a P2P communication session is established using a first or primary address. Initially, assume terminal 16, which is associated with User B, provides an update including a current address for terminal 16 to the directory service server 32 (step 200). When terminal 14 of User A desires to initiate communications with User B, terminal 14 will send a query to directory service server 32 to obtain User B's reachability information (step 202). Directory service server 32 will respond by providing User B's reachability information (step 204). Terminal 14 will use the reachability information to determine an address to use for initiating a P2P communication session with User B. Assuming terminal 14 determines to use the address associated with terminal 16, B IP ADDRESS, terminal 14 may send a SIP Invite message toward terminal 16 to initiate the P2P communication session (step 206). The SIP Invite message will identify the source address, A IP ADDRESS, the destination address, B IP ADDRESS, and perhaps any session data protocol (SDP) information, A SDP, to use for determining the parameters of the P2P communication session. Upon receipt of the SIP Invite message, terminal 16 will respond with a 180 Trying message (step 208), and when the attempted P2P communication session is answered, terminal 16 will respond with a 200 OK message with the session data protocol information, B SDP, for the P2P communication session (step 210). Terminal 14 will acknowledge the 200 OK message (step 212), wherein a Voice over Internet Protocol (VoIP) session is established between terminals 14 and 16 (step 214).

Figure 4:
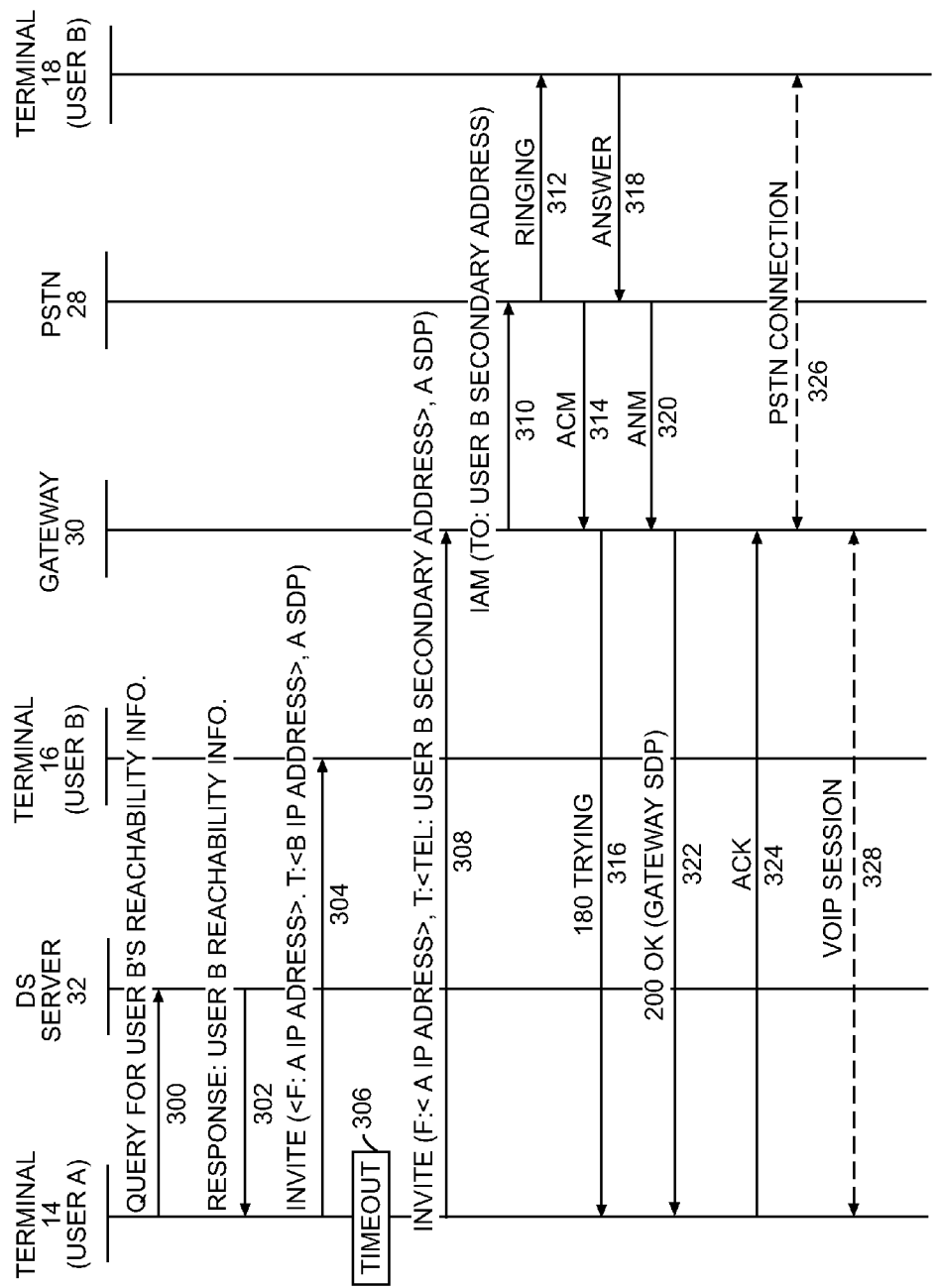
FIG. 4 is a communication flow diagram for establishing a P2P communication session to an alternate address according to one embodiment of the present invention.

With reference to FIG. 4, assume the attempt to terminal 16 was unsuccessful, and an alternate address associated with terminal 18 is used for an alternate attempt to establish a communication session with User B. Initially, terminal 14 will query the directory service server 32 for User B's reachability information (step 300). The directory service server 32 will respond by providing User B's reachability information to terminal 14 (step 302), which will send a SIP Invite message toward terminal 16 (step 304). Terminal 14 may set a timer to limit the amount of time that terminal 14 will wait for a response to the SIP Invite message that was sent to terminal 16. In this example, assume the timer times out (step 306), which will trigger terminal 14 to select an alternate address from the reachability information and attempt to initiate an alternate communication session with User B. In this example, the alternate address is associated with terminal 18, and terminal 14 will send a SIP Invite message toward terminal 18.

Since terminal 18 is supported by the PSTN via the gateway 30, the alternate address, USERB SECONDARY ADDRESS, will route the SIP Invite message to the gateway 30, as well as provide the gateway 30 with sufficient information to establish a circuit-switched connection through the PSTN 28 to terminal 18 (step 308). Upon receipt of the SIP Invite message, the gateway 30 will process the destination address information, and create an Initial Address Message (IAM) to initiate a circuit-switched call to terminal 18 and send the IAM through the PSTN 28 (step 310). The PSTN 28, and in particular a switch within the PSTN 28 will initiate a Ringing signal to terminal 18 (step 312) as well as sending an Address Complete Message (ACM) back to the gateway 30 in response to the IAM (step 314). The gateway 30 will respond by sending a 180 Trying message back to terminal 14 in response to the SIP Invite message (step 316).

When terminal 18 is answered (step 318), the PSTN 28 will detect the answer and send an Answer Message (ANM) to the gateway 30 (step 320), which will send a 200 OK message with the gateway's SDP information to terminal 14 (step 322). Terminal 14 will respond to the 200 OK message by sending an acknowledgement back to the gateway 30 (step 324). At this point, a PSTN connection is established between the gateway 30 and terminal 18 (step 326), and a VoIP session is established between terminal 14 and the gateway 30 (step 328). Terminal 14 and the gateway 30 will communicate with each other based on the SDP information exchanged in the SIP Invite message and the 200 OK message.

Figure 5:
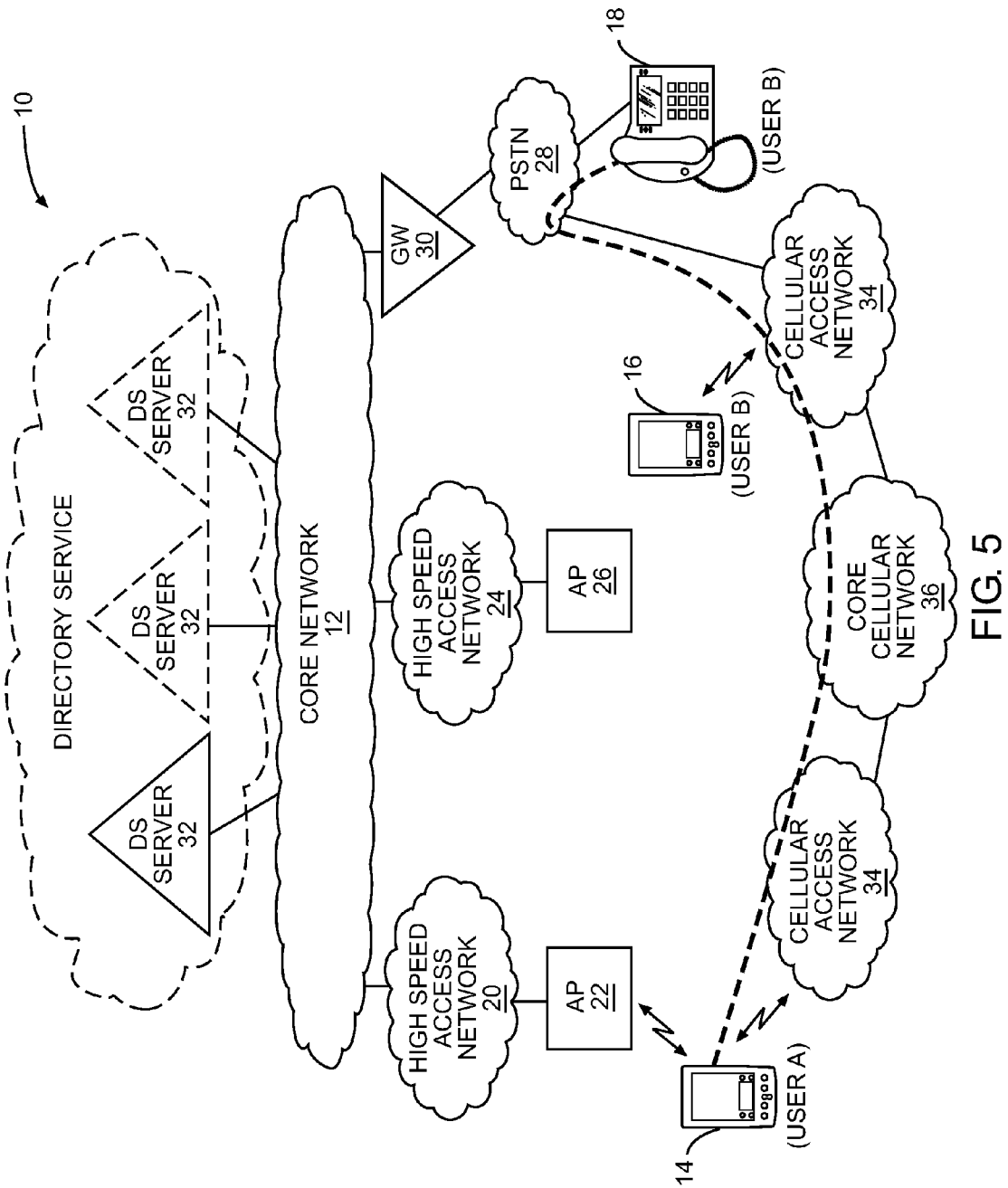
FIG. 5 is a block representation of a communication environment according a second embodiment of the present invention.

Turning now to FIG. 5, a communication environment 10 is illustrated as having a cellular component, which is made up of multiple cellular access networks 34, and maybe a network of base stations that are connected together by a core cellular network 36. Assume that terminals 14 and 16 may support cellular communications, when cellular communications are either selected or available. The communication session illustrated (dashed line) is an alternate communication session through an alternate network. In particular, the reachability information may identify a cellular or PSTN-based directory number to use as an alternate communication address for User B. If this alternate communication address is selected, terminal 14 will switch from a local wireless mode to a cellular mode and initiate a cellular call through the proximate cellular access network 34 to terminal 18 using the appropriate address, which in this case is the directory number associated with terminal 18. Although not illustrated, the directory number could have been associated with the cellular mode of terminal 16, wherein the communication session would have been routed through the cellular access networks 34 and the core network 36 to terminal 16 instead of to terminal 18 through the PSTN 28.

Figure 6:
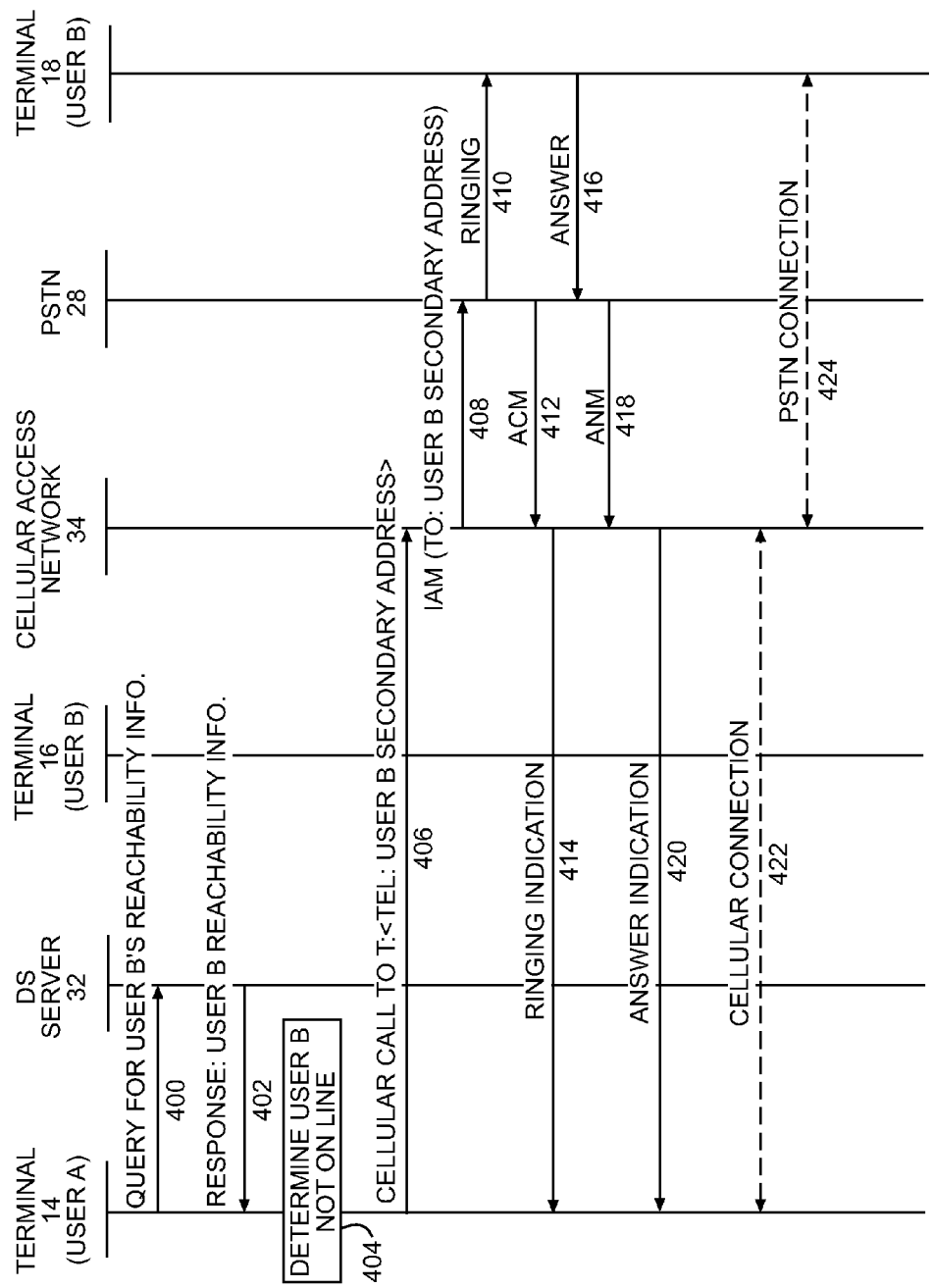
FIG. 6 is a communication flow diagram for establishing a call through an alternate network according to one embodiment of the present invention.

With reference to FIG. 6, a communication flow diagram for establishing a communication session through the alternate cellular network is provided. Initially, terminal 14 will send a query to the directory service server 32 to obtain User B's reachability information (step 400). The directory service server 32 will obtain and send User B's reachability information to terminal 14 (step 402). Terminal 14, in this embodiment, may determine that User B is not currently on line, which means that terminal 16 is not logged into or within communication range of an access point 22 or 26 to enable local wireless communications (step 404). As such, communication through local wireless techniques is not possible. Assuming User B's reachability information identifies an address, such as a directory number, for terminal 18, terminal 14 will initiate a cellular call to the directory number associated with terminal 18 (step 406). The call will initially be handled by the proximate cellular access network 34, which will cooperate with the core cellular network 36 to send an IAM to the PSTN 28 (step 408), which will initiate ringing of terminal 18 (step 410). The PSTN 28 will generate an ACM (step 412), which will result in the cellular access network 34 sending a Ringing Indication message to terminal 14 (step 414).

When terminal 18 is answered (step 416), the PSTN 28 will send an ANM to the cellular access network 34 (step 418), which will send an Answer Indication message to terminal 14 (step 420). At this point, a cellular connection is established between terminal 14 and the cellular access network 34 (step 422), and a PSTN connection is established between the cellular access network 34 and terminal 18 (step 424). The respective cellular and PSTN connections may be effectively bridged at a mobile switching center in traditional fashion.

Figure 7:
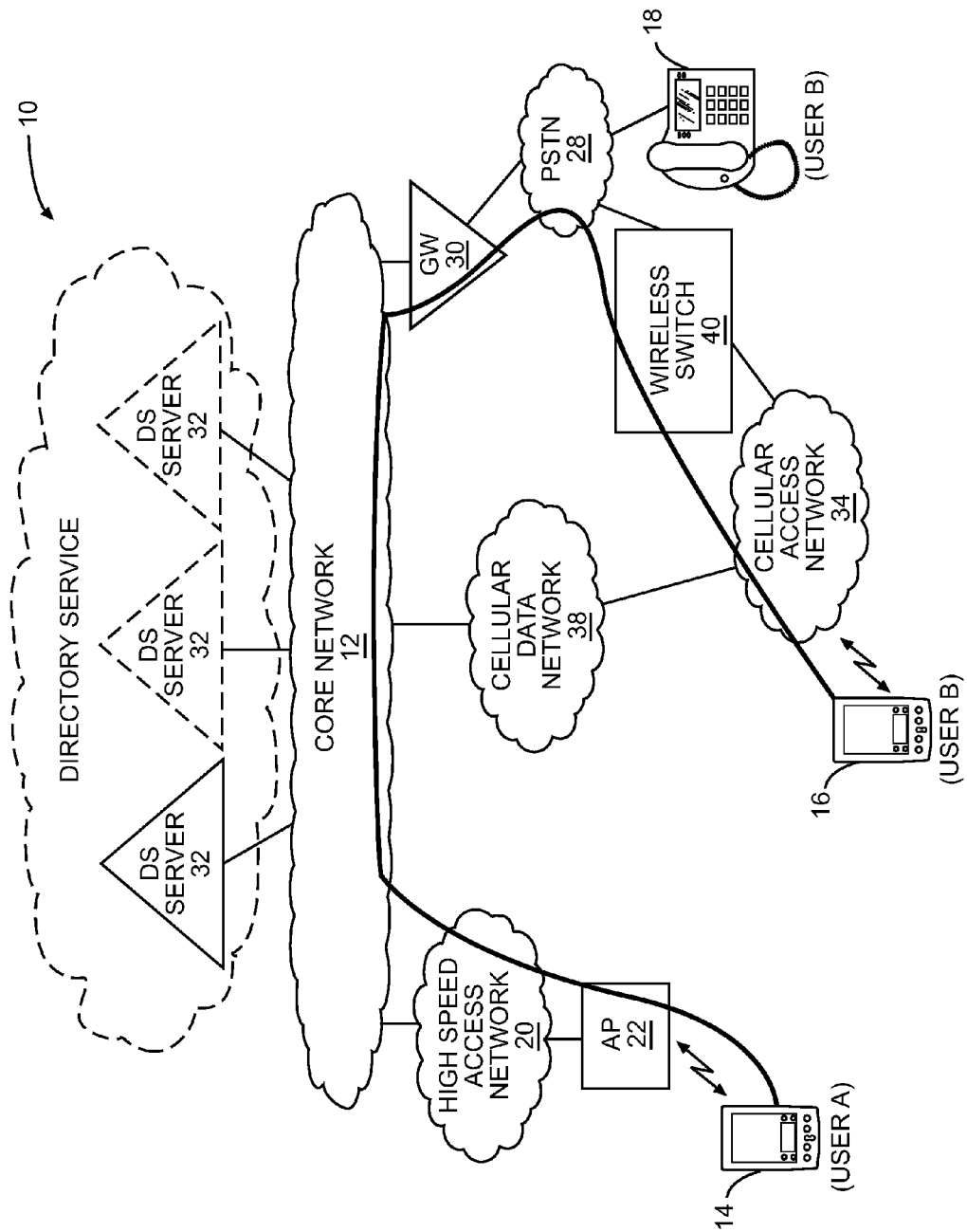
FIG. 7 is a block representation of a communication environment according to a third embodiment of the present invention.

From the above, the present invention may provide multiple addresses to which P2P communication sessions may be established from reachability information received from a directory service server 32. In another embodiment of the present invention, alternate address information may be received from a terminal to which a P2P communication session is being directed. With reference to FIG. 7, assume that a relatively low data rate cellular data network 38 is connected to a cellular access network 34. Further assume that the same cellular access network 34 supports traditional voice-based cellular communications via a wireless switch 40 and the PSTN 28. Accordingly, cellular communications for terminal 16 may include data or voice. The data is supported by the low data rate cellular data network 38, wherein the voice communications are supported through the wireless switch 40, PSTN 28, and perhaps the gateway 30. As illustrated, if the low data rate cellular data network 38 cannot support the desired P2P communication session, which may be a voice session, then the P2P communication session is established with the gateway 30, which will facilitate a more traditional call through the PSTN 28 and cellular access network 34 to terminal 16.

Figure 8:
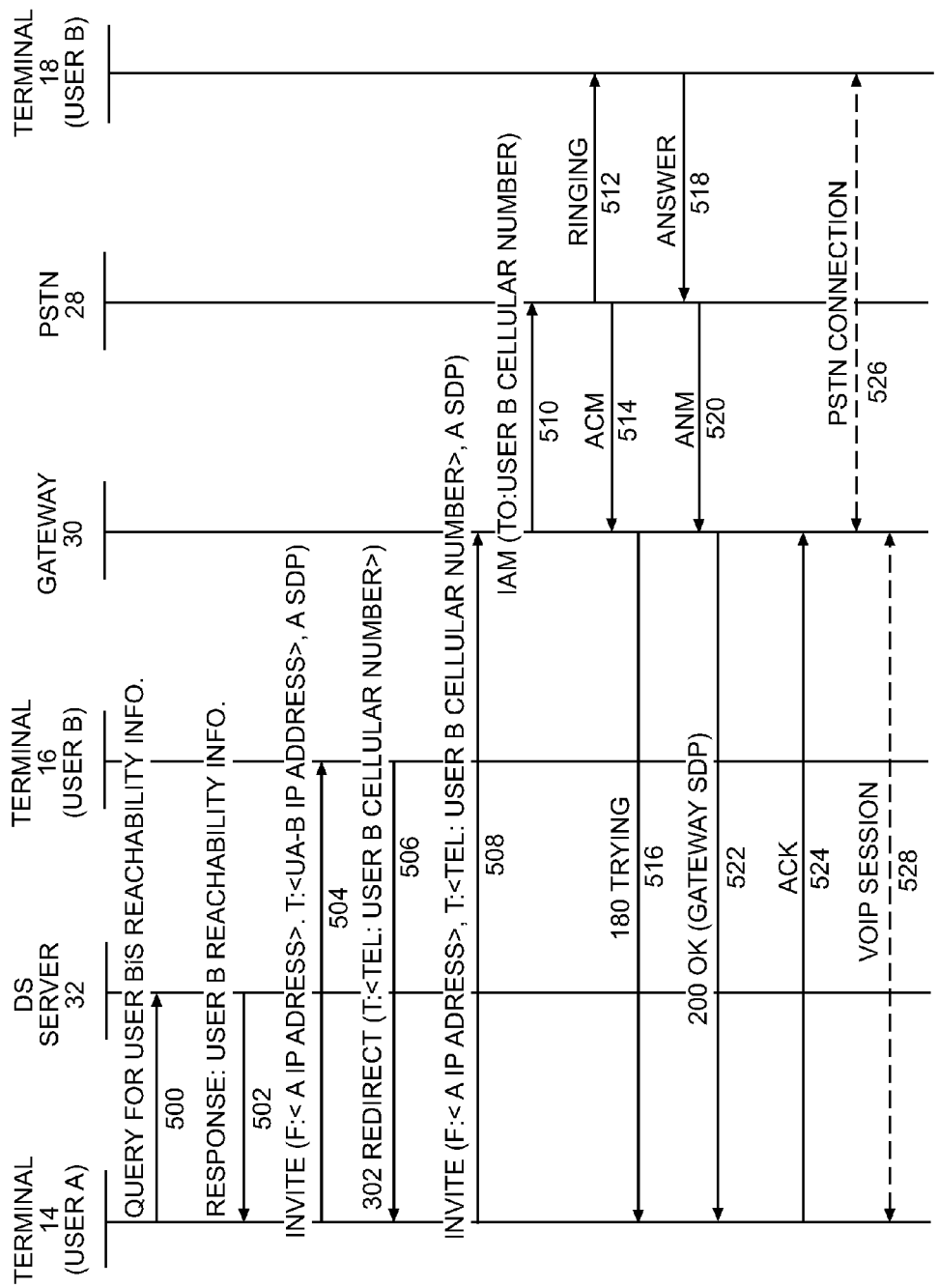
FIG. 8 is a communication flow diagram for rerouting a session to an alternate address according to one embodiment of the present invention.

With reference to FIG. 8, a communication flow is provided for the above scenario. Initially, assume terminal 14 sends a query for User B's reachability information in response to User A's instruction to initiate a P2P communication session with User B (step 500). The directory service server 32 will respond with User B's reachability information (step 502). Terminal 14 will send a SIP Invite message toward terminal 16 (step 504). Terminal 16 will receive the SIP Invite message and recognize that it was received through the low data rate cellular data network 38. As such, a voice-based P2P communication session cannot be supported, given the lack of available bandwidth. Terminal 16 will then send a 302 Redirect message toward terminal 14 (step 506). The 302 Redirect message will identify an alternate address to use for establishing a P2P communication session with User B, which in this case is the cellular number for terminal 16 of User B. Terminal 14 will then send a SIP Invite message to gateway 30 (step 508), which will initiate a circuit-switched call to terminal 16 using the associated cellular number. Terminal 14 may obtain the necessary information to identify gateway 30 from prior provisioning, User B's reachability information, or information provided by terminal 16.

Upon receiving the SIP Invite message, the gateway 30 will send an IAM to the PSTN 28 (step 510), which will begin ringing terminal 16 (step 512), as well as send an ACM back to the gateway 30 (step 514). In response to receiving the ACM, the gateway 30 will send a 180 Trying message to terminal 14 (step 516). When the PSTN 38 detects that terminal 16 has been answered (step 518), an ANM is sent to the gateway 30 (step 520), which will send a 200 OK message including the gateway's SDP information to terminal 14 (step 522). Terminal 14 will respond with an acknowledgement message (step 524), wherein a PSTN connection is established between the gateway 30 and terminal 16 (step 526) and a VoIP session is established between terminal 14 and the gateway 30 (step 528). Again, the gateway 30 will provide the necessary interworking to facilitate communications over the VoIP session and the PSTN connection for the P2P communication session. From the above, it is clear that the destination endpoint may respond back to the originating endpoint with alternate address information, which may be used to initiate a P2P or other type of communication session with the same or different endpoint associated with the destination user.

The originating terminal may process reachability information for a destination party in any number of ways. The reachability information will preferably include one or more addresses, which may be used by the originating terminal to initiate a P2P or other type of communication session. Selection of an address may be based on a priority provided by the directory service or based on status information, presence information, or a combination thereof, which may also be included in the reachability information. The status information will bear on a state or location of the destination user or a device associated with the destination user. The preference information may represent criteria or rules in which one or more addresses are selected and prioritized. Preference information may also dictate whether multiple P2P session attempts are initiated in sequence or simultaneously.

Figure 9:
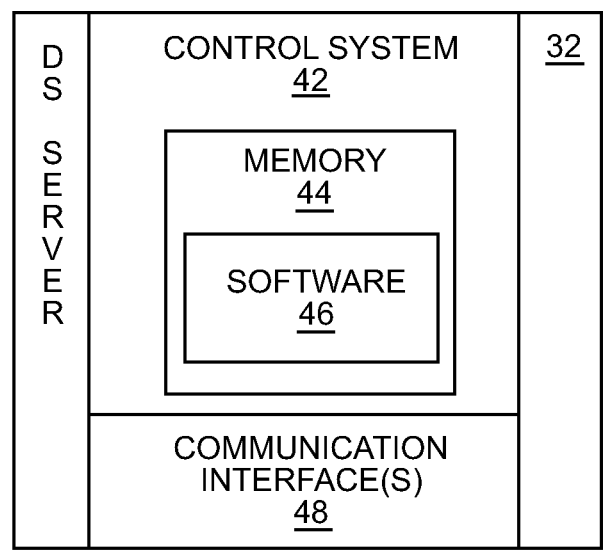
FIG. 9 is a block representation of a directory service server according to one embodiment of the present invention.

With reference to FIG. 9, a block representation of a directory service server 32 is illustrated. Again, the directory service server 32 may represent one or more traditional servers or a server of an endpoint client, which cooperates with other entities to facilitate peer-to-peer communications. The directory service server 32 will include a control system 42 having sufficient memory 44 and software 46 to operate as described above. The control system 42 may be associated with one or more communication interfaces 48 to facilitate communications with the various terminals 14, 16, and 18, as well as other entities on the core network 12 or associated networks.

Figure 10:
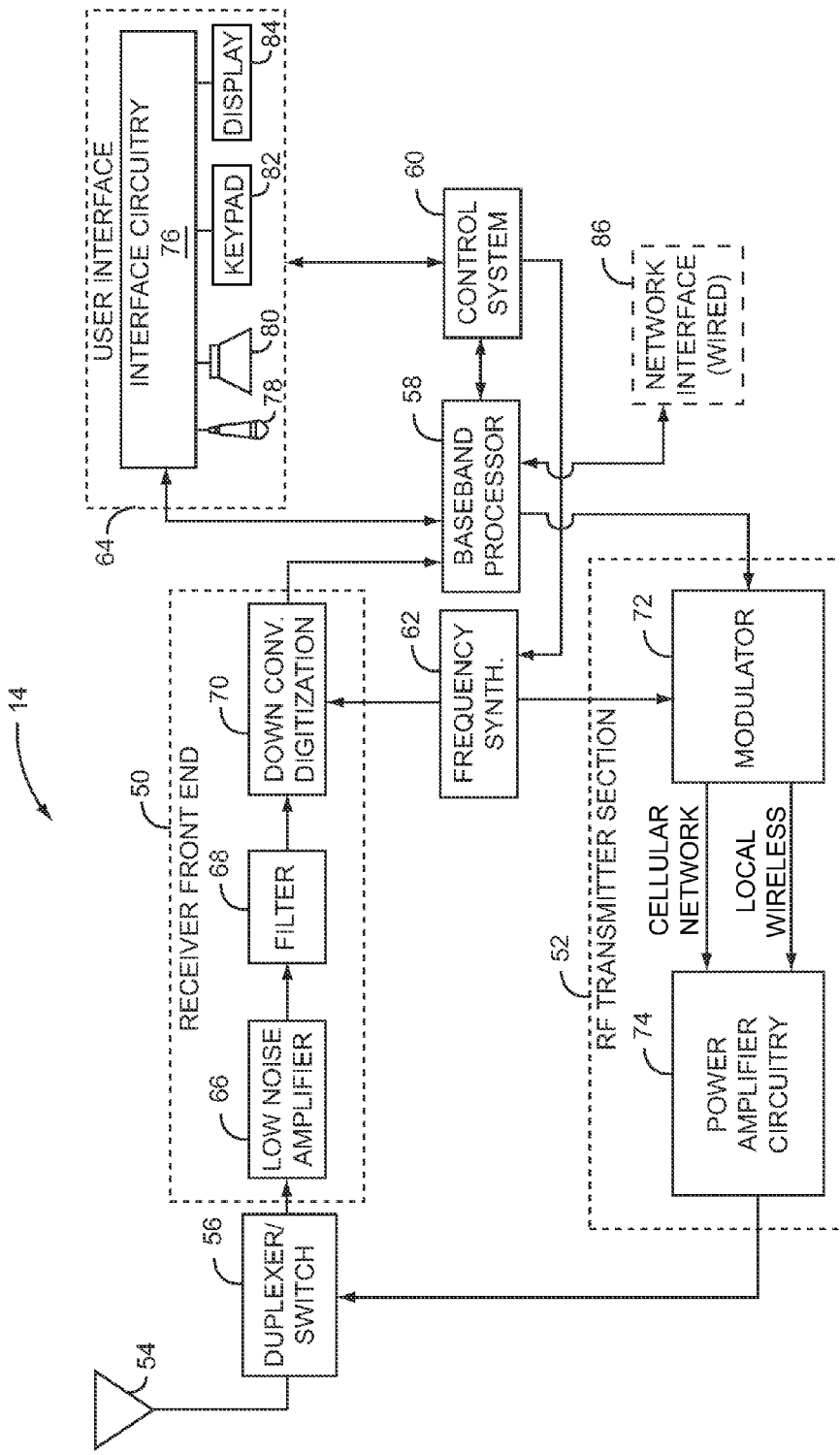
FIG. 10 is a block representation of a multi-mode terminal, which is adapted to support cellular or local wireless communications, according to one embodiment of the present invention.

The basic architecture of a terminal 14 or 16 is represented in FIG. 10 and will be generically referenced as terminal 14. The illustrated terminal 14 is a mobile terminal capable of local wireless and cellular operation. Those skilled in the art will recognize that the concepts of the present invention are applicable to wired or wireless terminals, wherein the terminals need support only one mode of communications. The terminal 14 may include a receiver front end 50, a radio frequency transmitter section 52, an antenna 54, a duplexer or switch 56, a baseband processor 58, a control system 60, a frequency synthesizer 62, and a user (originating party) interface 64. The receiver front end 50 receives information bearing radio frequency signals from one or more remote transmitters provided by a base station. A low noise amplifier 66 amplifies the signal. A filter circuit 68 minimizes broadband interference in the received signal, while downconversion and digitization circuitry 70 downconverts the filtered, received signal to an intermediate or baseband frequency signal, which is then digitized into one or more digital streams. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by a modulator 72 to modulate a carrier signal that is at a desired transmit frequency. Power amplifier circuitry 74 amplifies the modulated carrier signal to a level appropriate for transmission, and delivers the amplified and modulated carrier signal to the antenna 54 through the duplexer or switch 56. The control system 60 will operate to provide the functions described above that embody the concepts of the invention. The control system 60 may be integrated or distributed among different processing circuitry.

As noted above, the terminal 14 may be able to communicate wirelessly with the access points 22, 26 as well as with the cellular access network 34. Accordingly, the receiver front end 50, baseband processor 58, and radio frequency transmitter section 52 cooperate to provide either a wireless interface for the cellular access network 34 or the local wireless interface for the access points 22, 26. These functions may be implemented using redundant circuitry, or by configuring common circuitry to operate in different modes. The configuration of the terminal 14 will be dictated by economics and designer choice.

The originating user may interact with the terminal 14 via the interface 64, which may include interface circuitry 76 associated with a microphone 78, a speaker 80, a keypad 82, and a display 84. The interface circuitry 76 typically includes analog-to-digital converters, digital-to-analog converters, amplifiers, and the like. Additionally, it may include a voice encoder/decoder, in which case it may communicate directly with the baseband processor 58. The microphone 78 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 76 into an analog signal suitable for driving the speaker 80. The keypad 82 and display 84 enable the user to interact with the terminal 14, initiate communication sessions, input numbers to be dialed, access and select addresses or dialing plans, select from a number of available networks to use for communications, as well as provide traditional control of the terminal 14.

In addition to or in lieu of the local wireless and cellular interfaces, the terminal 14 may have other communication interfaces, such as a wired network interface 86, to facilitate communications using various communication technologies directly or via the access points 22, 26. Those skilled in the art will recognize the numerous types of communication interfaces available for the present invention. For additional information, please see U.S. application Ser. No. 10/409,280 filed Apr. 8, 2003 entitled INTEGRATED WIRELINE AND WIRELESS SERVICE, U.S. application Ser. No. 10/409,290 filed Apr. 8, 2003 entitled CALL TRANSFER FOR AN INTEGRATED WIRELINE AND WIRELESS SERVICE, U.S. application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER, U.S. application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, and U.S. application Ser. No. 10/784,743 filed Feb. 23, 2004 entitled CALL TRANSFER FOR AN INTEGRATED WIRELINE AND WIRELESS SERVICE, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A communication terminal comprising:
   a communication interface; and
   a control system associated with the communication interface and adapted to:
   obtain reachability information for a destination user from a directory service, the reachability information comprising a plurality of addresses, including at least one peer-to-peer communication address and a non-peer-to-peer communication address, each associated with the destination user;
   initiate a peer-to-peer communication session using the at least one peer-to-peer communication address;
   determine a primary and an alternate address from the plurality of addresses;
   initiate first and second communication sessions using the primary and alternate addresses;
   wherein the control system is further adapted to initiate the first and second communication sessions using the at least one peer-to-peer communication address and the non-peer-to-peer communication address.

2. The communication terminal of claim 1 wherein the communication session initiated using the non-peer-to-peer communication address is initiated via cellular communications.

3. The communication terminal of claim 2 wherein the peer-to-peer communication session initiated using the at least one peer-to-peer communication address is initiated using local wireless communications.

4. The communication terminal of claim 1 wherein the control system is further adapted to:
   substantially simultaneously initiate the peer-to-peer communication session and the communication session using the non-peer-to-peer communication address.

5. The communication terminal of claim 1 wherein the control system is further adapted to:
   initiate the communication session using the non-peer-to-peer communication address if the peer-to-peer communication session is not established using the at least one peer-to-peer communication address.

6. A communication terminal comprising:
   a communication interface; and
   a control system associated with the communication interface and adapted to:
   obtain reachability information for a destination user from a directory service, the reachability information comprising a plurality of addresses, including at least one peer-to-peer communication address associated with the destination user and selection indicia, wherein the selection indicia comprises preference information providing address selection criteria defined by the destination user, such that selecting at least one of the plurality of addresses to use for initiating a communication session with the destination user is based on the address selection criteria;
   initiate a peer-to-peer communication session using the at least one peer-to-peer communication address; and
   select at least one of the plurality of addresses to use for initiating a communication session with the destination user based on the selection indicia.

7. The communication terminal of claim 6 wherein the control system is further adapted to select a plurality of addresses to use for initiating communication sessions with the destination user based on the selection indicia.

8. The communication terminal of claim 6 wherein the control system is further adapted to select a plurality of addresses to use for initiating communication sessions with the destination user based on the selection indicia, and to determine an order in which the communication sessions are initiated, if multiple initiation attempts are necessary.

9. The communication terminal of claim 6 wherein the selection indicia comprises status information bearing on a state or location of the destination user or at least one endpoint associated with the destination user.

10. The communication terminal of claim 6 wherein at least one of the plurality of addresses is a directory number associated with a cellular or public switched telephone device.

11. The communication terminal of claim 6 wherein at least one of the plurality of addresses is an address associated with a gateway, which facilitates circuit-switched communications with a device associated with the destination user.

* * * * *